(12) United States Patent
Lee (10) Patent No.: US 8,766,111 B2
(45) Date of Patent: Jul. 1, 2014

(54) BAGGAGE HANDLE DEVICE HAVING A RETRACTABLE WEIGHING MECHANISM THAT PIVOTS OUT OF THE HANDLE IN USE, AND IS LOCKED DOWN INTO THE HANDLE WHEN NOT IN USE

(76) Inventor: Chi-Chai Lee, Changhua (TW)

( * ) Notice: Subject to any disclaimer, the term of this patent is extended or adjusted under 35 U.S.C. 154(b) by 273 days.

(21) Appl. No.: 13/348,000

(22) Filed: Jan. 11, 2012

(65) Prior Publication Data

US 2013/0048391 A1   Feb. 28, 2013

(30) Foreign Application Priority Data

Aug. 25, 2011  (TW) .............................. 100130510 A (51) Int. Cl.
*G01G 19/58* (2006.01)

(52) U.S. Cl.
USPC .......................................... 177/126; 177/245

(58) Field of Classification Search
USPC .......... 177/126, 131, 132, 148, 149, 232, 245
See application file for complete search history.

(56) References Cited

U.S. PATENT DOCUMENTS

| 2,518,973 | A | * | 8/1950 | Atherton | 190/102 |
| 2,710,083 | A | * | 6/1955 | White | 190/102 |
| 2,759,577 | A | * | 8/1956 | White | 190/102 |
| 2,937,016 | A | * | 5/1960 | Westman | 177/156 |
| 3,090,454 | A | * | 5/1963 | Farrar et al. | 177/131 |
| 4,964,479 | A | * | 10/1990 | Sumida | 177/233 |
| 6,246,017 | B1 | * | 6/2001 | Yang | 177/148 |
| 6,410,864 | B1 | * | 6/2002 | Kim | 177/148 |
| 6,649,850 | B2 | * | 11/2003 | Strohmeier | 177/232 |
| 7,009,120 | B2 | * | 3/2006 | Lee | 177/232 |
| 7,378,604 | B2 | * | 5/2008 | Truong | 177/131 |
| 8,485,329 | B1 | * | 7/2013 | Roy et al. | 190/116 |
| 8,575,500 | B1 | * | 11/2013 | Genet, Sr. | 190/116 |
| 2007/0107947 | A1 | * | 5/2007 | Truong | 177/131 |
| 2007/0163813 | A1 | * | 7/2007 | Lewis | 177/148 |
| 2007/0193786 | A1 | | 8/2007 | Pohl | |
| 2012/0006600 | A1 | * | 1/2012 | Bieber et al. | 177/127 |
| 2012/0186926 | A1 | * | 7/2012 | Sheikh | 190/115 |
| 2012/0222904 | A1 | * | 9/2012 | Lu | 177/148 |
| 2013/0043080 | A1 | * | 2/2013 | Kritzler | 177/132 |

FOREIGN PATENT DOCUMENTS

WO   WO 2009111993   *   9/2009  ............ G01G 19/58

* cited by examiner

*Primary Examiner* — Randy W Gibson
(74) *Attorney, Agent, or Firm* — Jacobson Holman, PLLC.

(57) ABSTRACT

A handle device includes a securing unit secured to a baggage item, a handle unit, a locking unit and a scale unit. The handle unit is coupled separably to the securing unit and is formed with a receiving space. The locking unit is operable between a locked state, where the handle unit is secured to the securing unit, and an unlocked state, where the handle unit is permitted to be disposed above and separated from the securing unit. The scale unit is connected pivotally to the handle unit, and is pivotable downwardly from a closed state to be confined in the receiving space, to an opened state, where the locking unit is at the unlocked state and the scale unit is perpendicular to the handle unit for measuring the weight of the baggage item.

12 Claims, 11 Drawing Sheets

BAGGAGE HANDLE DEVICE HAVING A RETRACTABLE WEIGHING MECHANISM THAT PIVOTS OUT OF THE HANDLE IN USE, AND IS LOCKED DOWN INTO THE HANDLE WHEN NOT IN USE

CROSS-REFERENCE TO RELATED APPLICATION

This application claims priority of Taiwanese Application No. 100130510, filed on Aug. 25, 2011.

BACKGROUND OF THE INVENTION

1. Field of the Invention

The invention relates to a handle device, more particularly to a handle device having a scale.

2. Description of the Related Art

Figure 1:
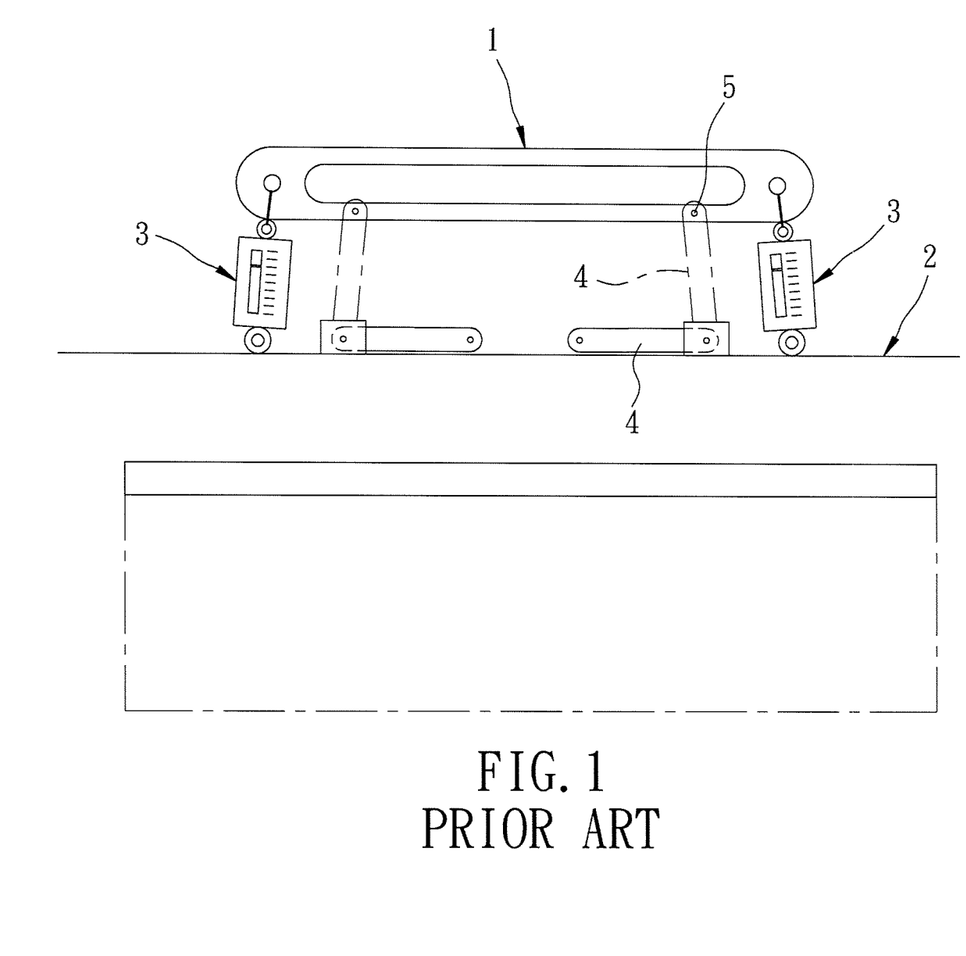
FIG. 1 is a schematic view of a conventional handle device illustrated in U.S. Patent Application Publication No. 2007/0193786 A1.

As shown in figure 1, U.S. Patent Application Publication No. 2007/0193786 A1 discloses a conventional handle device for a baggage item. The baggage item includes a main body 2. The conventional handle device includes a handle 1, a pair of spring scale units 3 and a pair of support members 4. Each of the scale units 3 has opposite ends interconnecting pivotally the main body 2 and a respective one of opposite end portions of the handle 1. Each of the support members 4 has an end connected pivotally to the main body 2, and a distal end connected pivotally and removably to the handle 1. The distal ends of the support members 4 can be connected pivotally to the handle 1 by using a pair of pivot pins 5 so that a user can carry the baggage item by grasping the handle 1 without overstretching or overcompressing the spring scale units 3. When the distal ends of the support members 4 are separated from the handle 1, the total weight of the main body 2 and stuff inside the main body 2 can be measured by the spring scale units 3.

However, since the readings of the spring scale units 3 may be different due to uneven weight of the stuff inside the main body 2, the readings of the spring scale units 3 have to be recorded individually and be summed up for the total weight of the main body 2 and the stuff inside the main body 2, thereby resulting in a relatively troublesome weight-measuring procedure. Moreover, the support members 4 have to be long enough to provide sufficient room between the handle 1 and the main body 2 for the resilient deformation of the spring scale units 3. Such configuration may lead to undesired swaying of the main body 2 during the movement of the user when holding the handle 1.

SUMMARY OF THE INVENTION

Therefore, the object of the present invention is to provide a handle device that is easy to use and that can alleviate the abovementioned drawbacks of the prior art.

Accordingly, a handle device of the present invention is adapted to be coupled to a baggage item. The handle device comprises a securing unit, a handle unit, a locking unit and a scale unit. The securing unit is adapted to be secured to the baggage item. The handle unit is coupled separably to the securing unit and is formed with a receiving space. The locking unit is operable between a locked state, where the handle unit is secured to the securing unit, and an unlocked state, where the handle unit is permitted to be disposed above and separated from the securing unit. The scale unit is connected pivotally to the handle unit, and is pivotable downwardly from a closed state to be confined in the receiving space, to an opened state, where the locking unit is at the unlocked state and the scale unit is perpendicular to the handle unit for scaling the weight of the baggage item.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
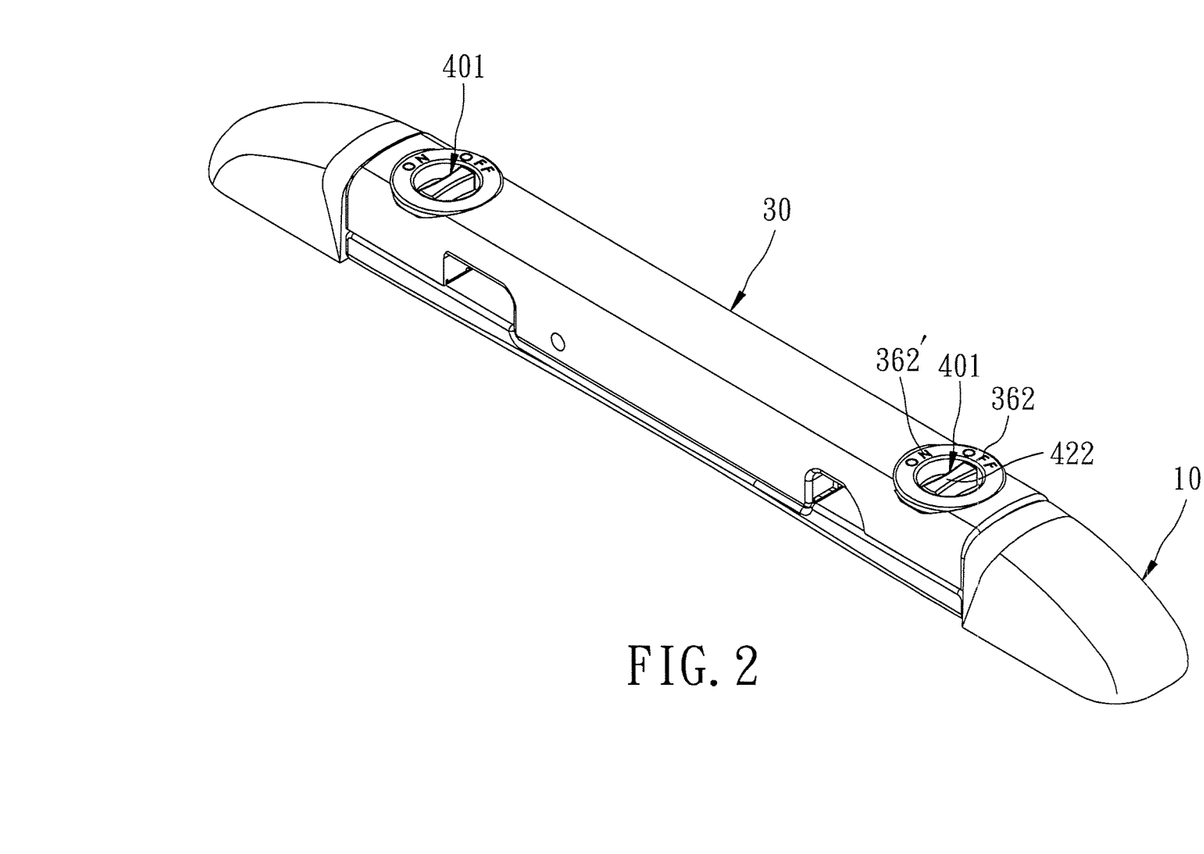
FIG. 2 is an assembled perspective view of a preferred embodiment of a handle device according to the invention.
Figure 3:
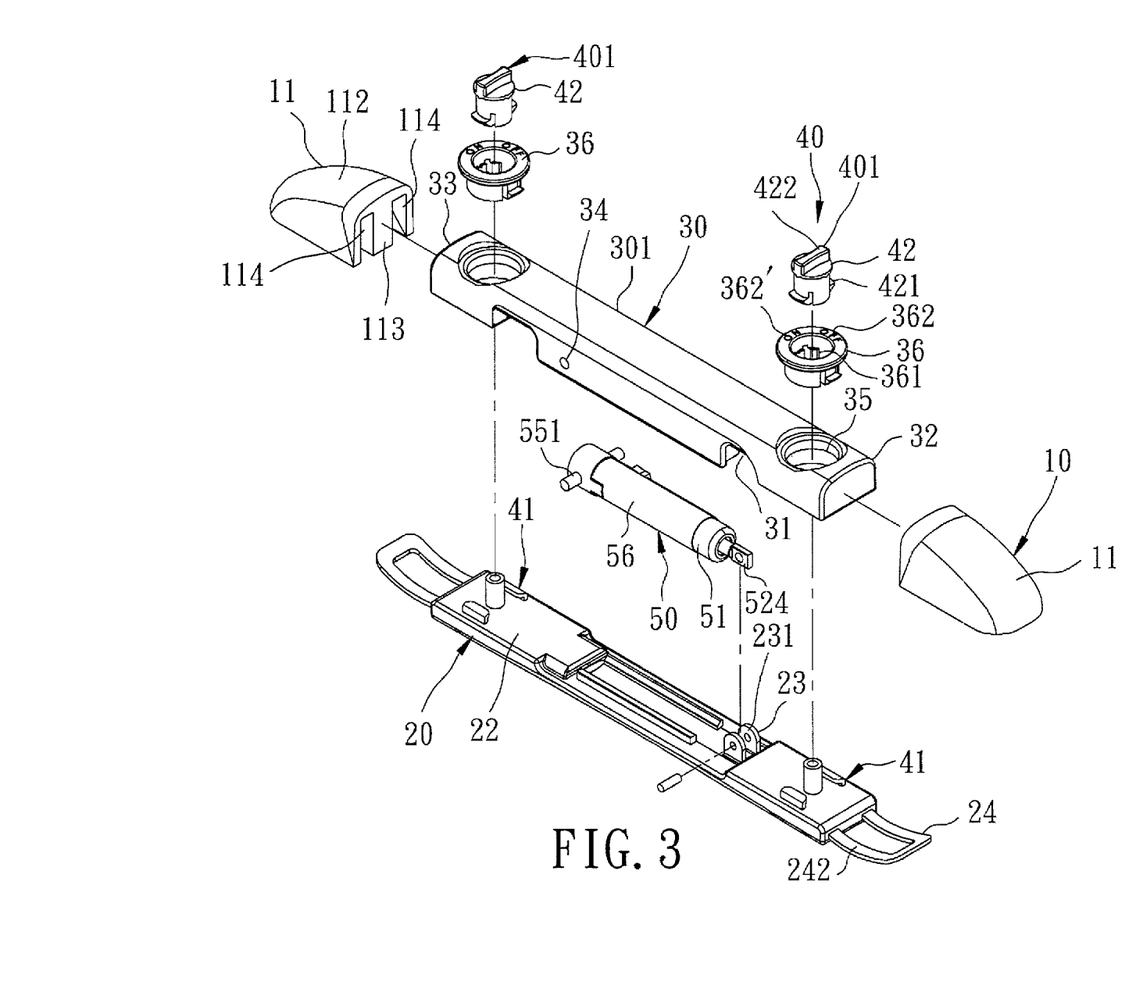
FIG. 3 is an exploded perspective view of the preferred embodiment.
Figure 5:
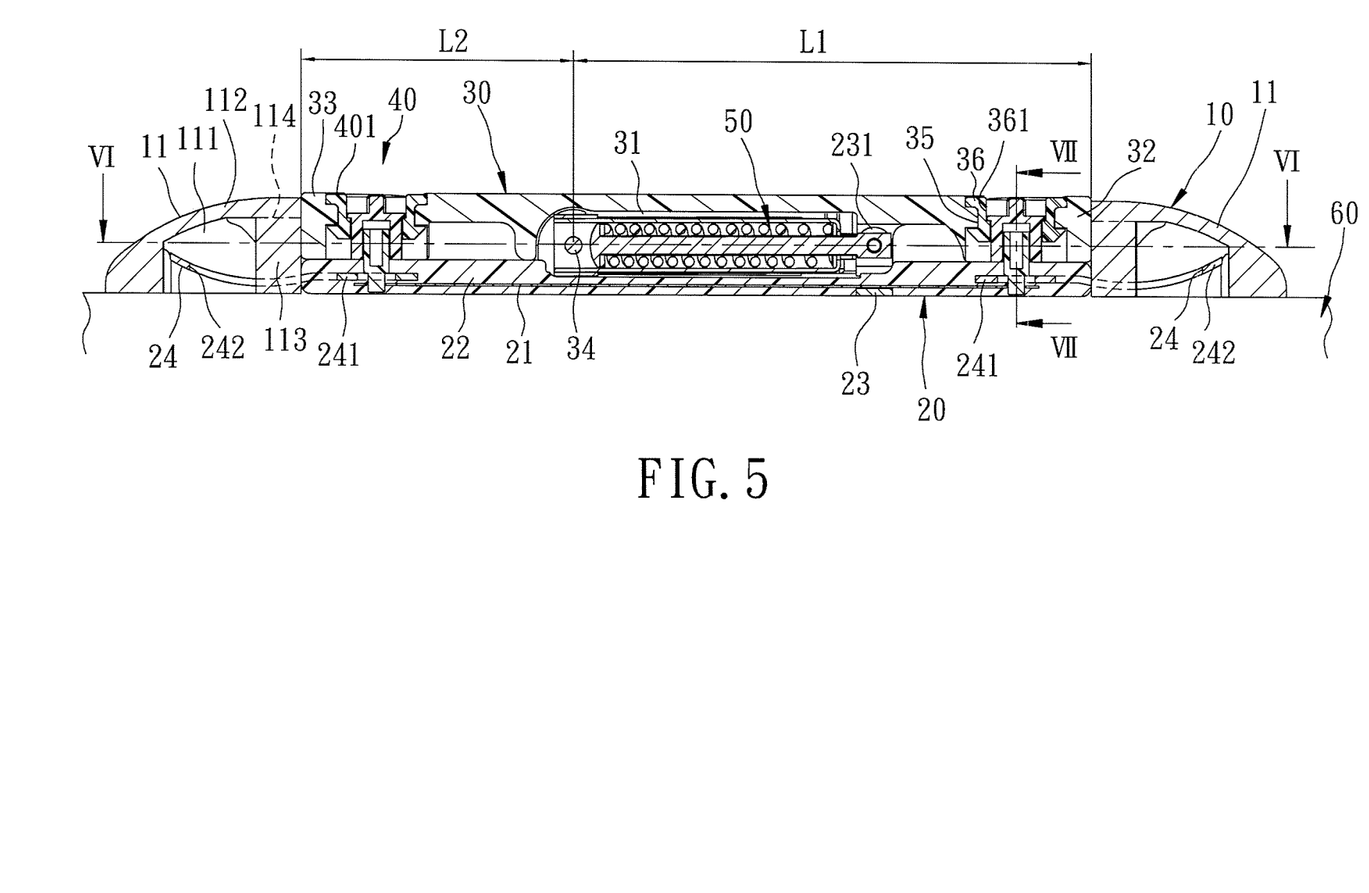
FIG. 5 is a sectional view of the preferred embodiment, illustrating the scale unit s at a closed state.

Referring to FIGS. 2, 3 and 5, the preferred embodiment of a handle device according to the present invention is adapted to be coupled to a baggage item 60, such as a suitcase. The handle device comprises a securing unit 10, a handle unit 30, a locking unit 40 and a scale unit 50.

The securing unit 10 includes a pair of spaced-apart stationary seats 11 secured to the baggage item 60, and a coupling mechanism 20 connected between the stationary seats 11. Each of the stationary seats 11 has a seat housing 112 defining an inner space 111 therein, and a lock segment 113 projecting inwardly from the seat housing 112 into the inner space 111 to divide a portion of the inner space 111 into a pair of slide grooves 114 which communicate spatially with the rest of the inner space 111. The coupling mechanism 20 includes an elongated coupling member 22, a core member 21 disposed within the coupling member 22, a pivot seat 23 engaging the core member 21 and extending outwardly of the coupling member 22, and a pair of connecting members 24 secured respectively to longitudinally-opposite ends of the coupling member 22 and connected slidably and respectively to the stationary seats 11. The pivot seat 23 has a positioning portion 231 extending outwardly of the coupling member 22. Each of the connecting members 24 is substantially ring-shaped, and has a securing end segment 241 that is embedded in a respective one of the longitudinally-opposite ends of the coupling member 22, and a surrounding end segment 242 that is disposed in the slide grooves 114 and the inner space 111 of a respective one of the stationary seats 11 and that surrounds loosely the lock segment 113 of the respective one of the stationary seats 11.

The handle unit 30 is coupled to the coupling mechanism 20, and includes an elongated main handle body 301 that has an inverted U-shaped cross-section and that defines a receiving space 31 therein. The main handle body 301 has opposite first and second ends 32, 33 flanking the receiving space 31, a pivot section 34 disposed between the first and second ends 32, 33, and a pair of insert holes 35 formed therein adjacent respectively to the first and second ends 32, 33. The handle unit 30 further includes a pair of guide components 36 inserted respectively in the insert holes 35. A first distance (L1) between the pivot section 34 to the first end 32 is configured to be longer than a second distance (L2) between the pivot section 34 and the second end 33. In this embodiment, the first distance (L1) is not less than 4 inches. Each of the guide components 36 is formed with a stepped through hole 361, and has a flange portion that surrounds an end of the through hole 361 and that has two marked parts 362, 362' marked respectively with text "OFF" and "ON".

Figure 6:
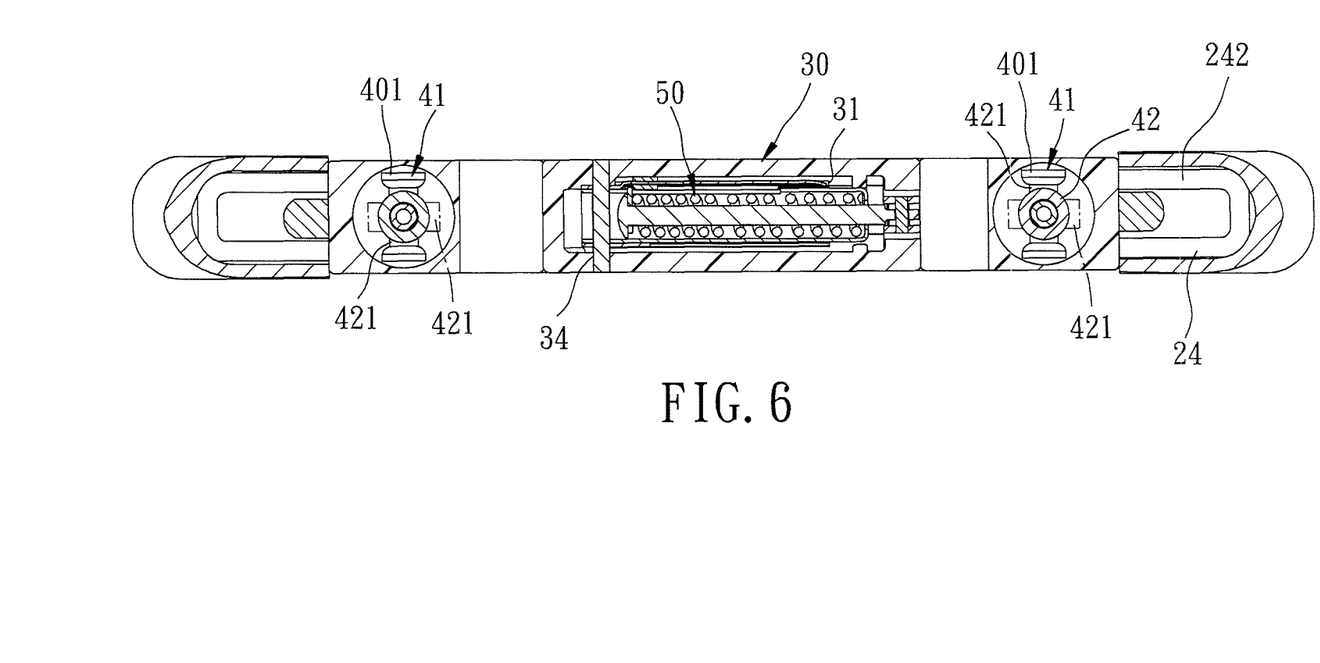
FIG. 6 is another sectional view of the preferred embodiment, taken along line VI-VI in FIG. 5.
Figure 7:
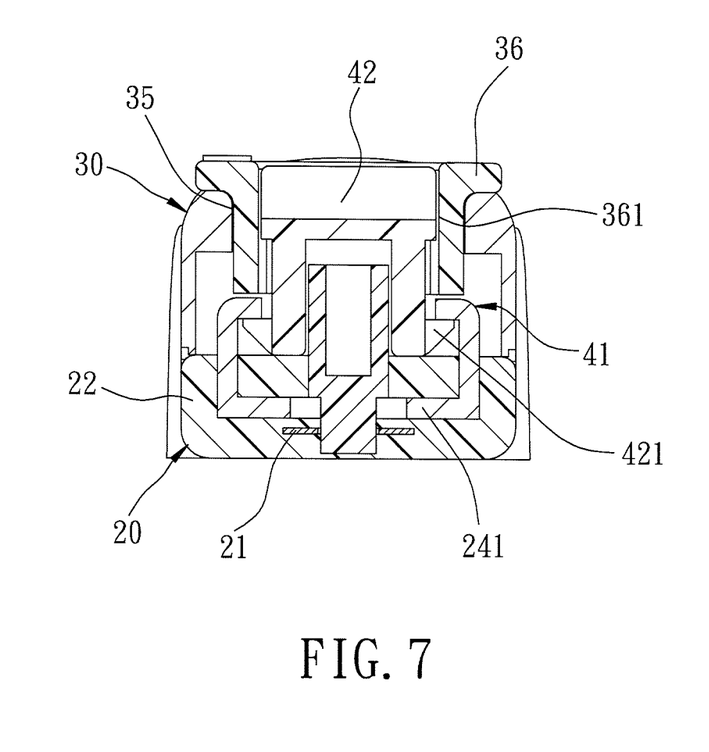
FIG. 7 is still another sectional view of the preferred embodiment taken along line VII-VII in FIG. 5.

The locking unit 40 includes a pair of locking mechanisms 401. Each of the locking mechanisms 401 includes a pair of retaining members 41 provided on the coupling mechanism 20 at a position corresponding to the through hole 361 of a respective one of the guide components 36, and a rotatable member 42 engaging rotatably the through hole 361 of the respective one of the guide components 36. The retaining members 41 of each locking mechanism 401 are connected integrally to a respective one of the connecting members 24 of the coupling mechanism 20, and are configured to be inverted L-shaped. The rotatable member 42 of each locking mechanism 401 is formed with a pair of engaging portions 421 at the bottom thereof that are adjacent to the retaining members 41 of a corresponding locking mechanism 401, and an access portion 422 at the top thereof that is adjacent to the marked parts 362, 362' of the corresponding guide component 36. The locking unit 40 is operable between a locked state (see FIGS. 5, 6 and 7), where the access portion 422 of each rotatable member 42 is registered with the marked part 362 of a corresponding guide component 36 and where the engaging portions 421 of each rotatable member 42 engage respectively the corresponding retaining members 41, and an unlocked state (see FIG. 9), where the access portion 422 of each rotatable member 42 is registered with the marked part 362' of the corresponding guide component 36 and where the engaging portions 421 of each rotatable member 42 are disengaged from the corresponding retaining members 41 (as illustrated in dotted lines in FIG. 6).

Figure 4:
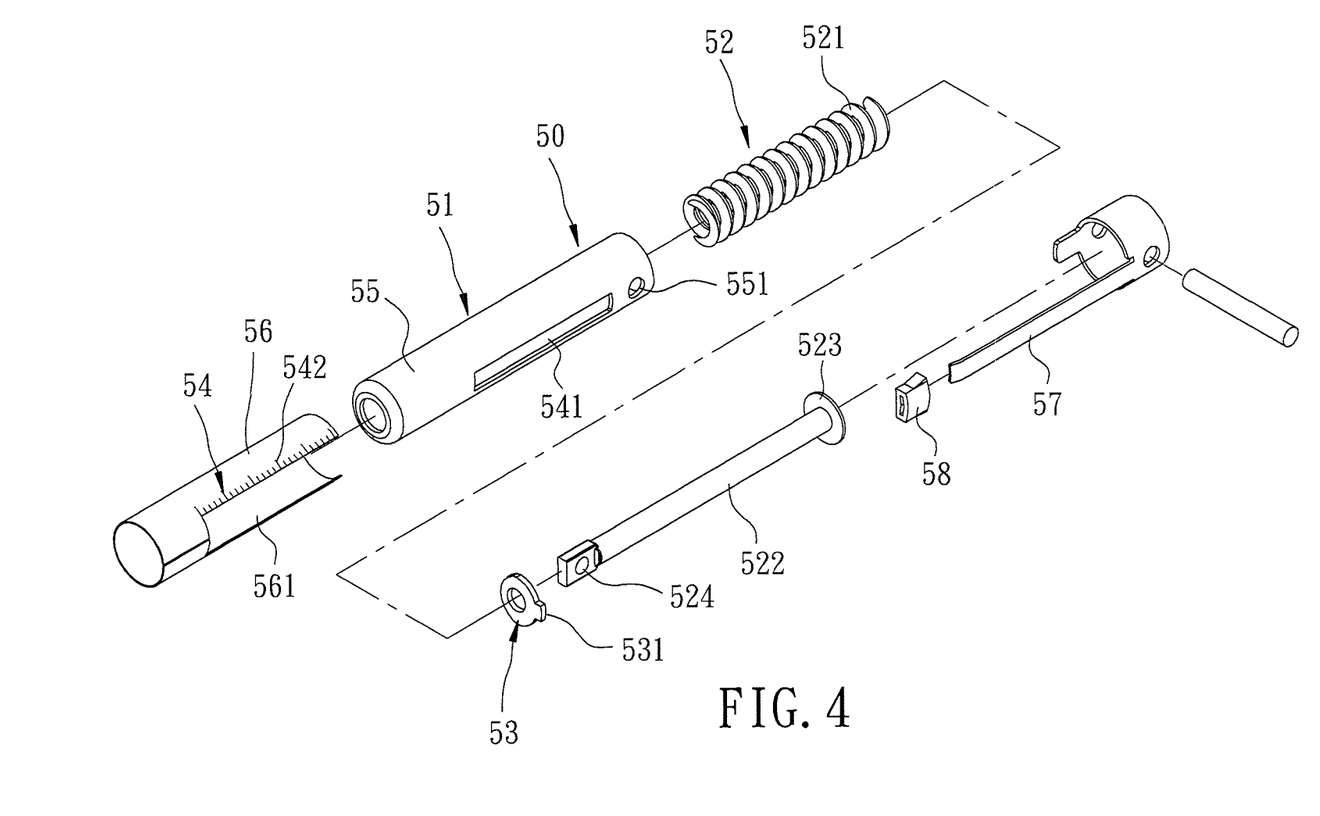
FIG. 4 is an exploded perspective view of a scale unit of the preferred embodiment.
Figure 8:
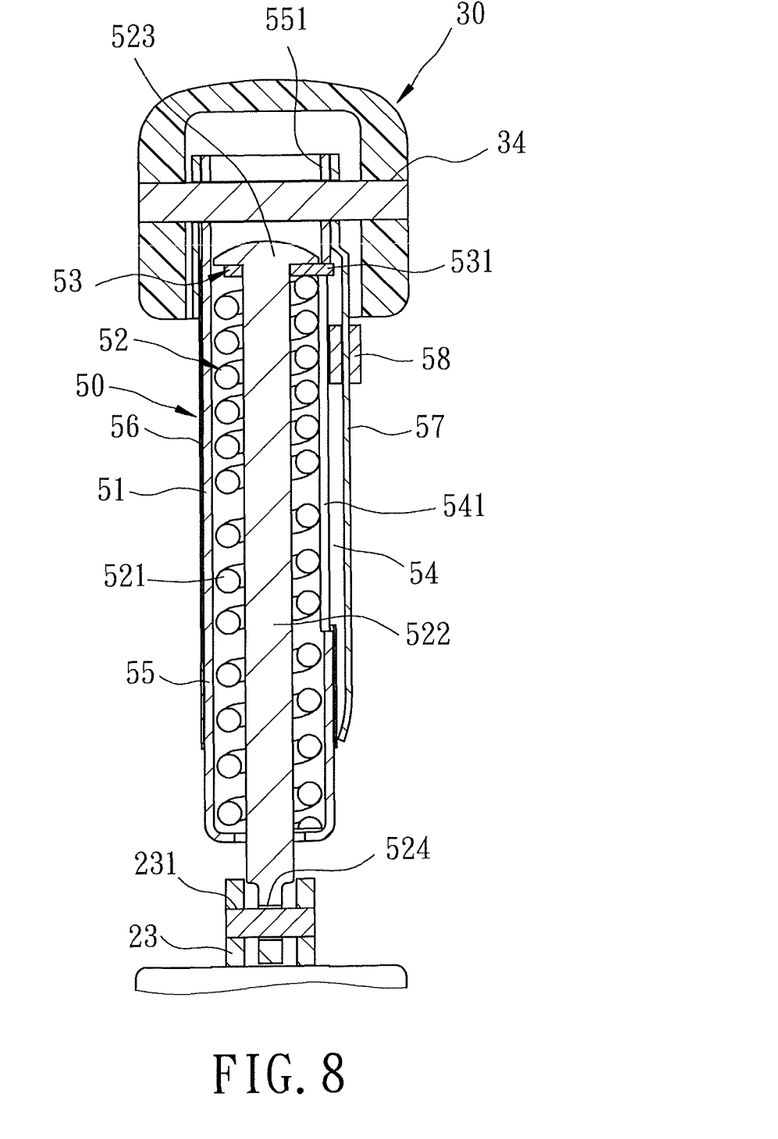
FIG. 8 is yet another sectional view of the preferred embodiment, illustrating the scale unit at an opened state.

As shown in FIGS. 4, 5 and 8, the scale unit 50 includes a tubular main scale body 51, a resilient member 52, and an indicating member 53.

The main scale body 51 includes a barrel component 55, an elongated sleeve component 56, a scale member 54, a rail component 57 and a slide block 58. The barrel component 55 has a pivot end portion 551 connected pivotally to the pivot section 34 of the main handle body 301 of the handle unit 30. The sleeve component 56 is sleeved slidably on the barrel component 55 and is formed with a longitudinally-extended slot 561. The scale member 54 includes a longitudinally-extended through groove 541 formed in the barrel component 55 and registered with the slot 561 of the sleeve member 56 for exposing a portion of the indicating member 53, and a scale 542 marked on the sleeve component 56 and adjacent to the slot 561. The rail component 57 extends outside the sleeve component 56 from the pivot end portion 551 in a longitudinal direction, and corresponds in position to the through groove 541 on the barrel component 55. The slide block 58 is sleeved slidably on the rail component 57.

The resilient member 52 is disposed in the barrel component 55 of the main scale body 51, and includes a coil spring 521 and an urging shaft 522. The coil spring 521 maybe an extension spring or a compression spring. In this embodiment, the coil spring 521 is configured as a compression spring. The urging shaft 522 is connected to the coil spring 521 and has a head portion 523 adjacent to the pivot end portion 551 of the barrel component 55, and a connecting end portion 524 opposite to the head portion 523 and connected pivotally to the positioning portion 231 of the pivot seat 23 of the securing unit 10.

The indicating member 53 is sleeved on the urging shaft 522 and is disposed between the coil spring 521 and the head portion 523 of the urging shaft 522 so as to be co-movable with the resilient member 52. The indicating member 53 has an abutment portion 531 extending radially and outwardly through the through groove 541 of the barrel component 55 and the slot 561 of the sleeve component 56, and abuts separably against the slide block 58.

Referring back to FIGS. 2, 5 and 6, before use, the handle unit 30 is coupled to a top surface of the baggage item 60 and is disposed between the stationary seats 11 of the securing unit 10, the scale unit 50 is at a closed state to be confined in the receiving space 31 of the main handle body 301, and the locking unit 40 can be moved to the locked state to secure the handle unit 30 on the coupling mechanism 20 of the securing unit 10.

Figure 11:
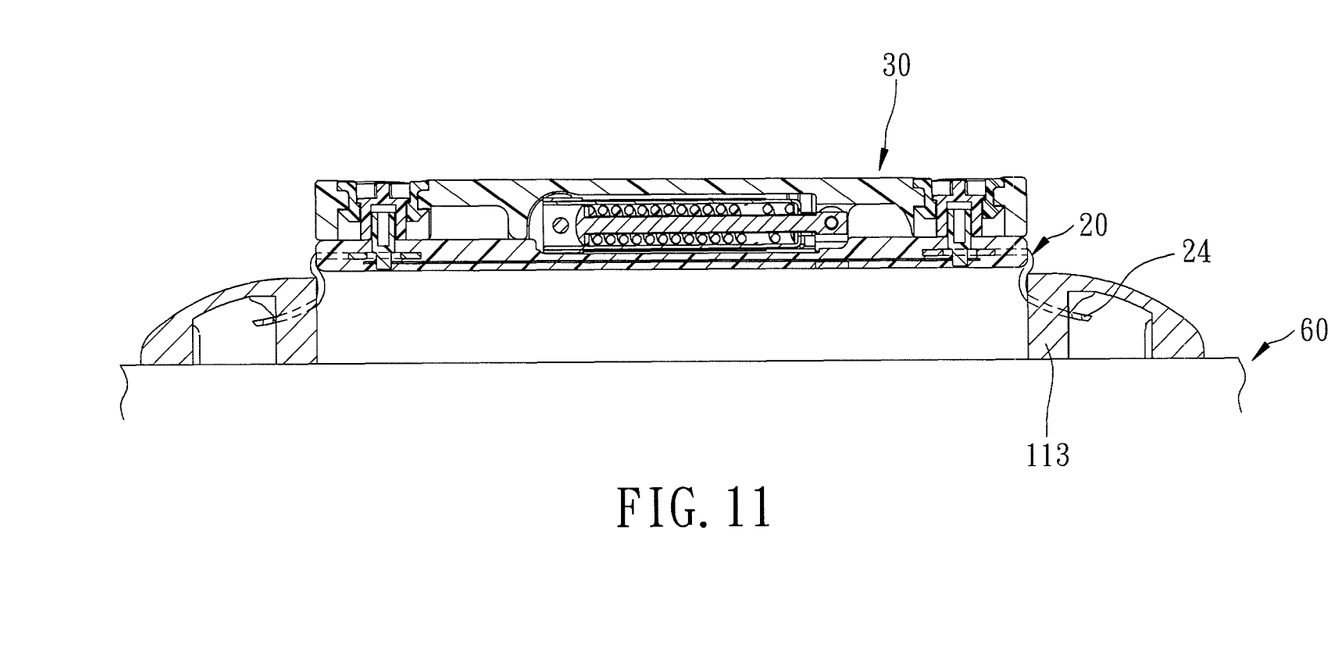
FIG. 11 is yet another sectional view, illustrating the preferred embodiment being operated as a handle with the scale unit at the closed state.

At this time, as shown in FIG. 11, the handle unit 30 can be pulled upwardly to separate the handle unit 30 from the baggage item 60 for a predetermined distance while the connecting members 24 of the coupling mechanism 20 move upwardly and inwardly until the distal segments of the connecting members 24 abut respectively against top ends of the lock segments 113 of the securing seats 11 so as to serve as a handle of the baggage item 60 that can be easily held by a user.

Figure 9:
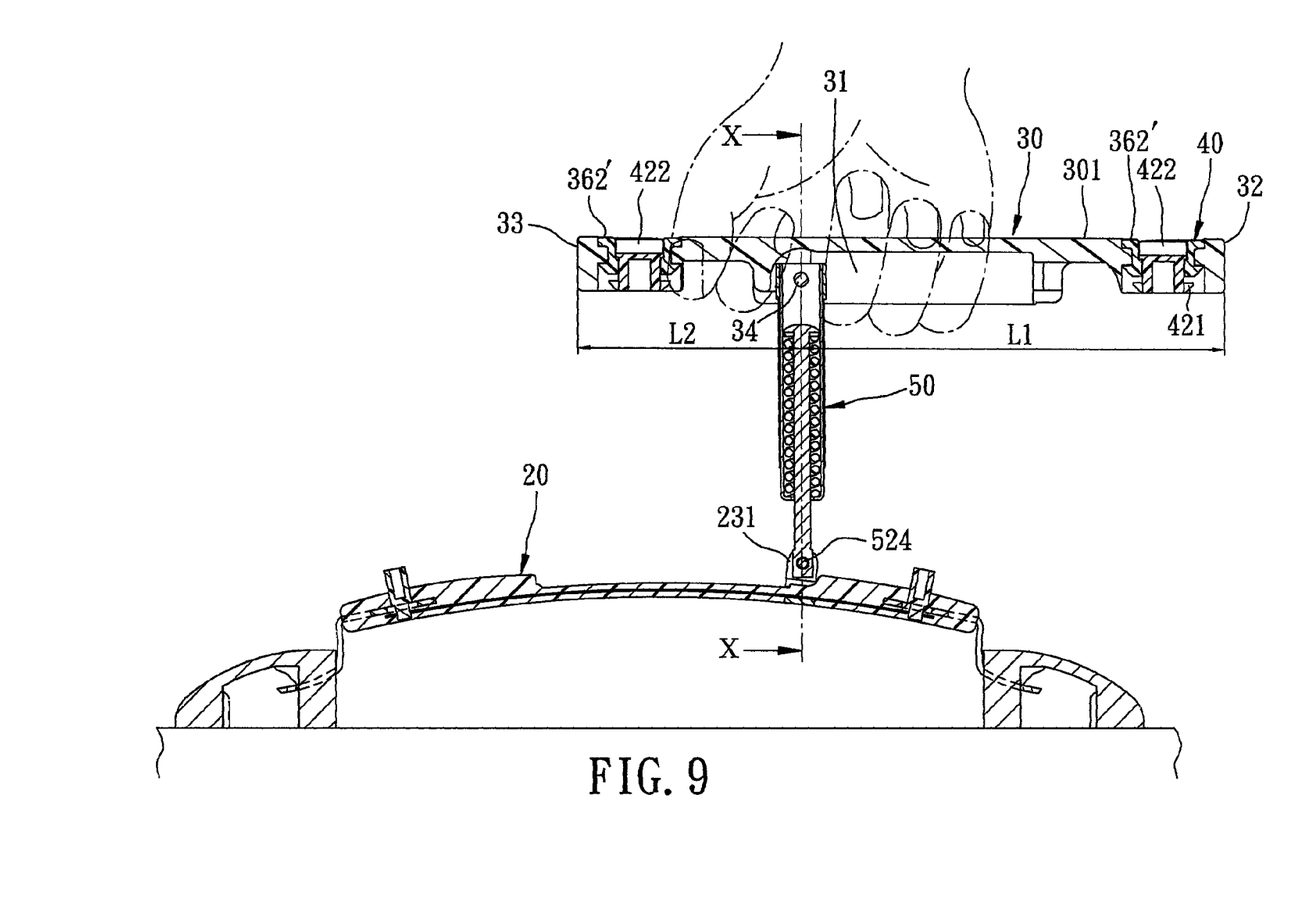
FIG. 9 is still another sectional view of the preferred embodiment, illustrating a weight-measuring operation of the preferred embodiment.
Figure 10:
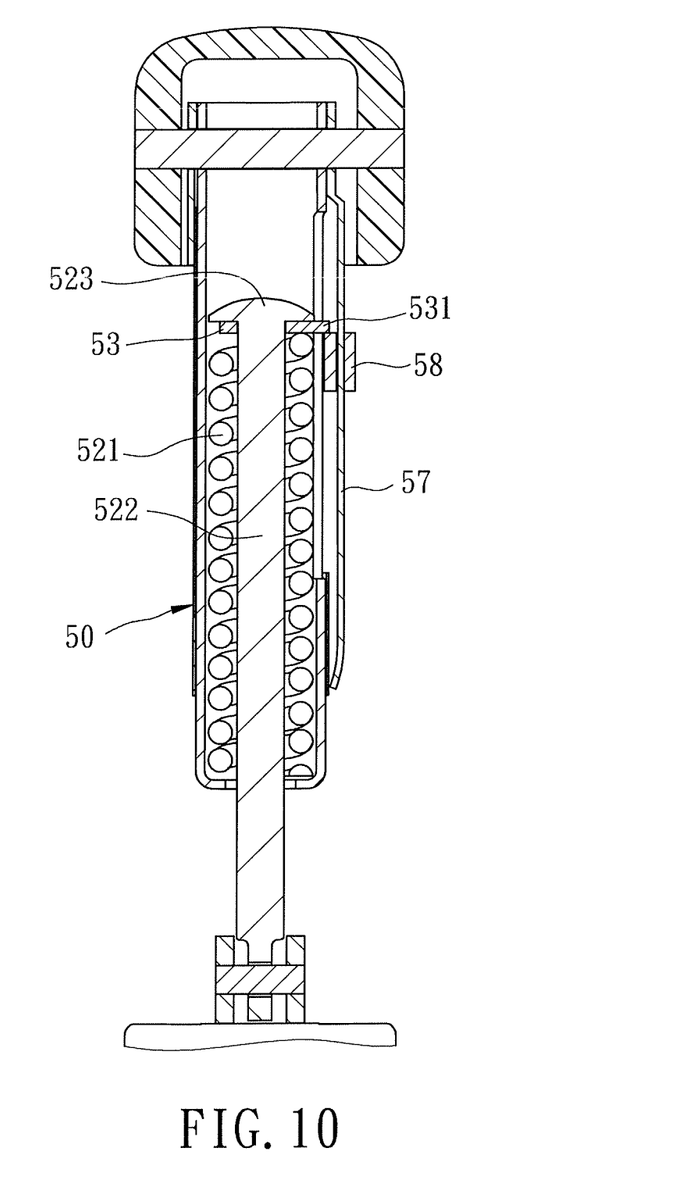
FIG. 10 is yet another sectional view of the preferred embodiment taken along line X-X in FIG. 9.

As shown in FIGS. 9 and 10, when the locking unit 40 is moved to the unlocked state, the handle unit 30 can be further lifted and be removed from the coupling mechanism 20 of the securing unit 10 to thereby drive the scale unit 50 to pivot downwardly from the closed state to an opened state, where the scale unit 50 is perpendicular to the handle unit 30, and the scale unit 50 is ready to measure the weight of the baggage item 60. During the measuring process, the weight of the baggage item 60 pulls downwardly the urging shaft 522 of the resilient member 52, the coil spring 521 is compressed, and the indicating member 53 is urged to move downwardly together with the head portion 523 of the urging shaft 522, thereby moving downwardly the abutment portion 531 along the registered through groove 541 and the slot 561. Finally, at the end of the abovementioned movement of the resilient member 52, the abutment portion 531 of the indicating member 53 indicates on the scale 542 the reading of the weight of the baggage item 60.

During the weight-measuring process, the slide block 58 would be urged to move together with the indicating member 53 along the rail component 57. When the weight measuring process is accomplished and the baggage item 60 is placed on the ground (i.e., the force exerted on the resilient member 52 is removed), the indicating member 53 would be moved by a restoring force of the coil spring 521 back to a normal position, while the slide block 58 remains at a position corresponding to the specific point on the scale 542 that shows the reading of the weight of the baggage item 60 for the user's reference until the beginning of the next weight-measuring action. Additionally, when the coil spring 521 suffers from elastic fatigue after long-term use and is unable to move the indicating member 53 back to the normal position after the weight-measuring process, the sleeve component 56 can be moved in the longitudinal direction relative to the barrel component 55, thereby adjusting the position of the scale 542 to properly cooperate with the indicating member 53 for correctly showing the reading.

To sum up, when the weight-measuring process is not required, the handle unit 30 can serve as a normal handle of the baggage item 60 with the scale unit 50 at the closed state and be conveniently held by the user. When the locking unit 40 is turned from the locked state to the unlocked state, the user can easily move the scale unit 50 from the closed state to the opened state by simply lifting the handle unit 30. Moreover, the reading of the weight of the baggage item 60 is measured by the single scale unit 50 and is consequently not required to be further calculated. Furthermore, as clearly shown in FIG. 9, the ergonomic design of the difference between the first and second distances (L1, L2) and the minimum limitation of the first distance (L1) on the main handle body 301 of the handle unit 30 enables the user to conveniently hold the handle unit 30 by hand.

It should be noted that, in other embodiments of this invention, the connecting end portion 524 of the urging shaft 522 of the resilient member 52 may be formed as a hook extending removably through the positioning portion 231 of the pivot seat 23 of the coupling mechanism 20, thereby permitting the scale unit 50 to be removed from the baggage item 60 for measuring weight of other objects.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A baggage handle device adapted to be coupled to a baggage item, comprising:
    a securing unit adapted to be secured to the baggage item;
    a handle unit coupled separably to said securing unit and formed with a receiving space; and
    a locking unit operable between a locked state, where said handle unit is secured to said securing unit, and an unlocked state, where said handle unit is permitted to be disposed above and separated from said securing unit; and
    a scale unit connected pivotally to said handle unit, and pivotable downwardly from a closed state to be confined in said receiving space, to an opened state, where said locking unit is at the unlocked state and said scale unit is perpendicular to said handle unit for measuring the weight of the baggage item;
    wherein said securing unit includes a pair of spaced-apart stationary seats adapted to be secured to the baggage item, and a coupling mechanism connected between said stationary seats;
    wherein said handle unit is coupled to said coupling mechanism and disposed between said stationary seats when said scale unit is at the closed state;
    wherein said scale unit has a pivot end portion connected pivotally to said handle unit, and a connecting end portion opposite to said pivot end portion for being connected pivotally to said coupling mechanism of said securing unit; and
    wherein said coupling mechanism of said securing unit includes
        a coupling member,
        a core member disposed within said coupling member,
        a pivot seat engaging said core member, extending outwardly of said coupling member and having a positioning portion for being connected pivotally to said connecting end portion of said scale unit, and
        a pair of connecting members secured respectively to opposite ends of said coupling member and connected slidably and respectively to said stationary seats of said securing unit.

2. A baggage handle device adapted to be coupled to a baggage item, comprising:
    a securing unit adapted to be secured to the baggage item;
    a handle unit coupled separably to said securing unit and formed with a receiving space; and
    a locking unit operable between a locked state, where said handle unit is secured to said securing unit, and an unlocked state, where said handle unit is permitted to be disposed above and separated from said securing unit; and
    a scale unit connected pivotally to said handle unit, and pivotable downwardly from a closed state to be confined in said receiving space, to an opened state, where said locking unit is at the unlocked state and said scale unit is perpendicular to said handle unit for measuring the weight of the baggage item;
    wherein said securing unit includes a pair of spaced-apart stationary seats adapted to be secured to the baggage item, and a coupling mechanism connected between said stationary seats;
    wherein said handle unit is coupled to said coupling mechanism and disposed between said stationary seats when said scale unit is at the closed state;
    wherein said scale unit has a pivot end portion connected pivotally to said handle unit, and a connecting end portion opposite to said pivot end portion for being connected pivotally to said coupling mechanism of said securing unit; and
    wherein said locking unit includes a pair of locking mechanisms, each including:
        a retaining member provided on said coupling mechanism of said securing unit, and
        a rotatable member connected rotatably to said handle unit and formed with an engaging portion,
        said engaging portions of said rotatable members of said locking mechanisms engaging respectively said retaining members when said locking unit is at the locked state, and being rotated to be disengaged respectively from said retaining members when said locking unit is at the unlocked state.

3. The baggage handle device as claimed in claim 1, wherein said handle unit includes a main handle body defining said receiving space therein, said main handle body having opposite first and second ends that flank the receiving space, and a pivot section that is disposed between said first and second ends, a distance between said pivot section and said first end being longer than that between said pivot section and said second end and not less than 4 inches.

4. The baggage handle device as claimed in claim 1, wherein said scale unit includes a main scale body having said pivot end portion, a resilient member connected to and resiliently movable relative to said main scale body, and an indicating member connected co-movably to said resilient member, said main scale body further having a scale member for showing the reading of the weight of the baggage item indicated by said indicating member.

5. The baggage handle device as claimed in claim 4, wherein:
said main scale body is tubular;
said resilient member is disposed in said main scale body, and has a coil spring and an urging shaft that has an end connected to said coil spring and an opposite end that is configured as said connecting end portion;
said indicating member is connected co-movably to said end of said urging shaft; and
said scale member includes a through groove formed in said main scale body and a scale marked adjacent to said through groove.

6. The baggage handle device as claimed in claim 5, wherein:
said main scale body includes a barrel component having said pivot end portion, and a sleeve component sleeved slidably on said barrel component and formed with a slot; and
said scale member includes a through groove formed in said barrel component and registered with said slot for exposing said indicating member, and a scale marked on said sleeve component and adjacent to said slot.

7. The baggage handle device as claimed in claim 6, wherein:
said main scale body further includes a rail component that extends from said pivot end portion of said barrel component and that corresponds in position to said through groove of said barrel component and said slot of said sleeve component, and a slide block that is sleeved slidably on said rail component; and
said indicating member has an abutment portion that extends outwardly through said through groove and said slot for abutting against said slide block.

8. The baggage handle device as claimed in claim 2, wherein said handle unit includes a main handle body defining said receiving space therein, said main handle body having opposite first and second ends that flank the receiving space, and a pivot section that is disposed between said first and second ends, a distance between said pivot section and said first end being longer than that between said pivot section and said second end and not less than 4 inches.

9. The baggage handle device as claimed in claim 2, wherein said scale unit includes a main scale body having said pivot end portion, a resilient member connected to and resiliently movable relative to said main scale body, and an indicating member connected co-movably to said resilient member, said main scale body further having a scale member for showing the reading of the weight of the baggage item indicated by said indicating member.

10. The baggage handle device as claimed in claim 9, wherein:
said main scale body is tubular;
said resilient member is disposed in said main scale body, and has a coil spring and an urging shaft that has an end connected to said coil spring and an opposite end that is configured as said connecting end portion;
said indicating member is connected co-movably to said end of said urging shaft; and
said scale member includes a through groove formed in said main scale body and a scale marked adjacent to said through groove.

11. The baggage handle device as claimed in claim 10, wherein:
said main scale body includes a barrel component having said pivot end portion, and a sleeve component sleeved slidably on said barrel component and formed with a slot; and
said scale member includes a through groove formed in said barrel component and registered with said slot for exposing said indicating member, and a scale marked on said sleeve component and adjacent to said slot.

12. The baggage handle device as claimed in claim 11, wherein:
said main scale body further includes a rail component that extends from said pivot end portion of said barrel component and that corresponds in position to said through groove of said barrel component and said slot of said sleeve component, and a slide block that is sleeved slidably on said rail component; and
said indicating member has an abutment portion that extends outwardly through said through groove and said slot for abutting against said slide block.

* * * * *